April 9, 1968     S. H. BINGHAM     3,376,830

RAILWAY VEHICLE SUSPENSION SYSTEM

Filed July 16, 1965     7 Sheets-Sheet 1

INVENTOR.
SIDNEY H. BINGHAM
BY
*Darley & Darley*
ATTORNEYS

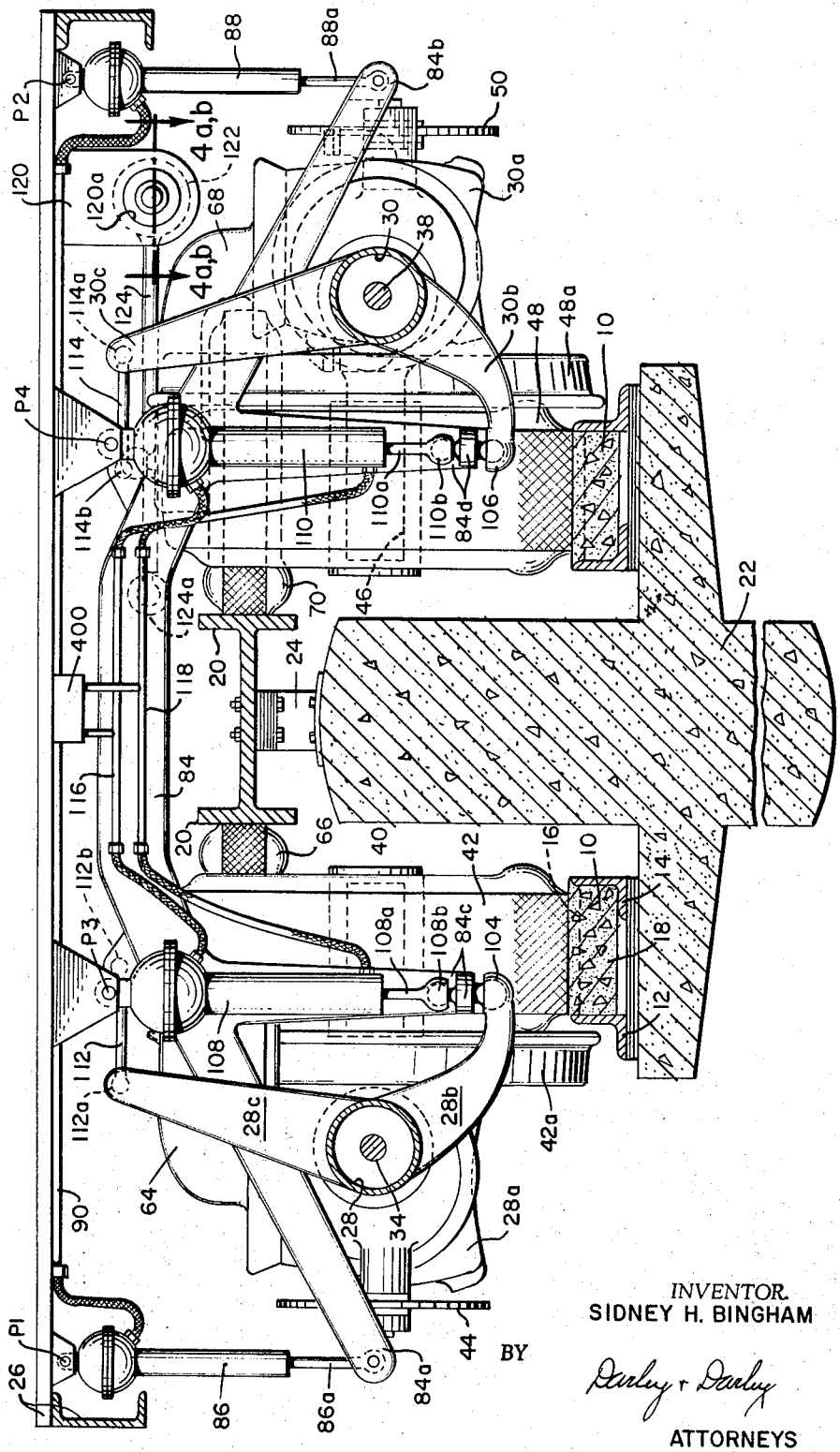

April 9, 1968
S. H. BINGHAM
3,376,830
RAILWAY VEHICLE SUSPENSION SYSTEM
Filed July 16, 1965
7 Sheets-Sheet 3
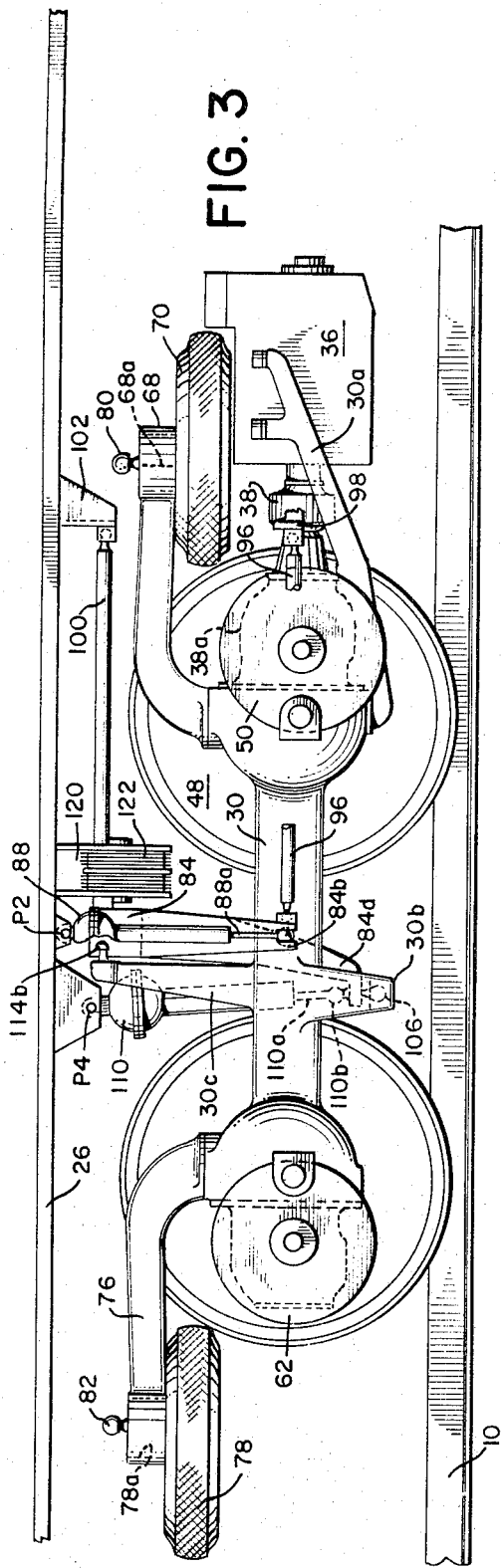
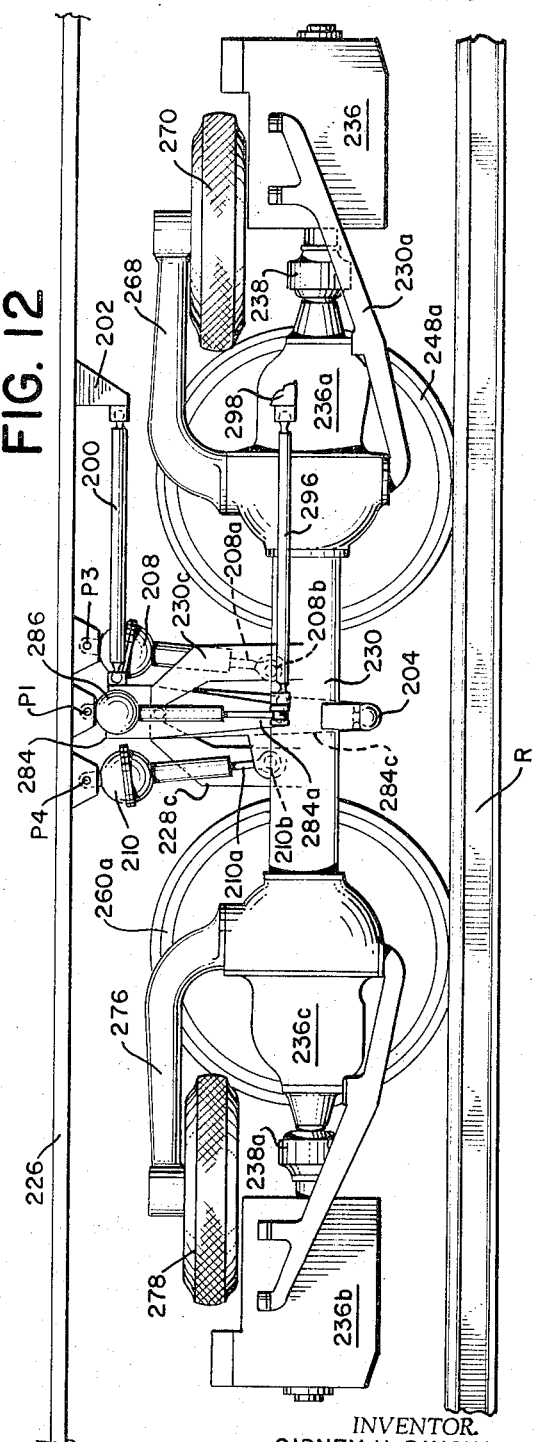
INVENTOR.
SIDNEY H. BINGHAM
BY
Darby & Darby
ATTORNEYS

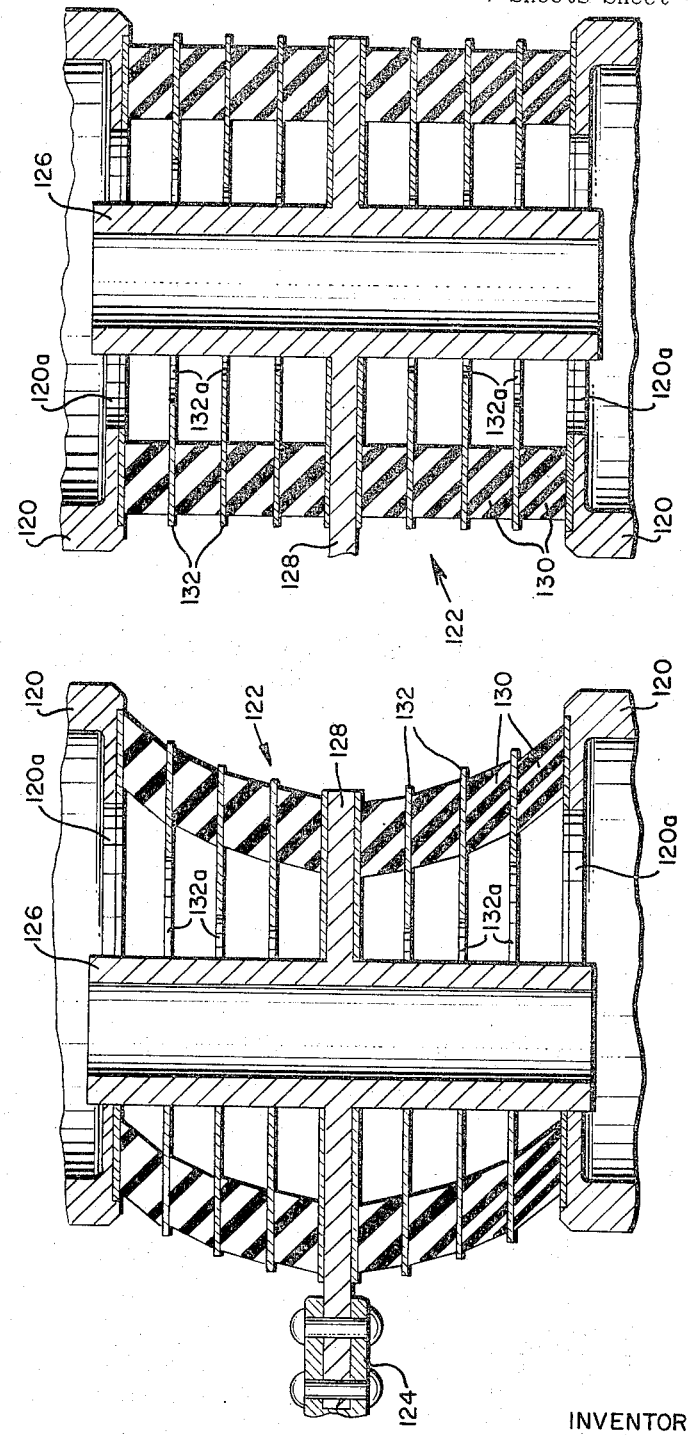

April 9, 1968  S. H. BINGHAM  3,376,830
RAILWAY VEHICLE SUSPENSION SYSTEM
Filed July 16, 1965  7 Sheets-Sheet 5
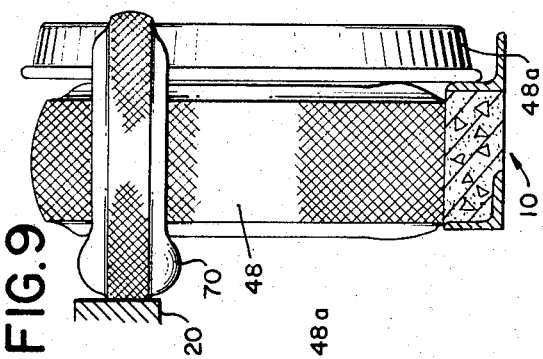
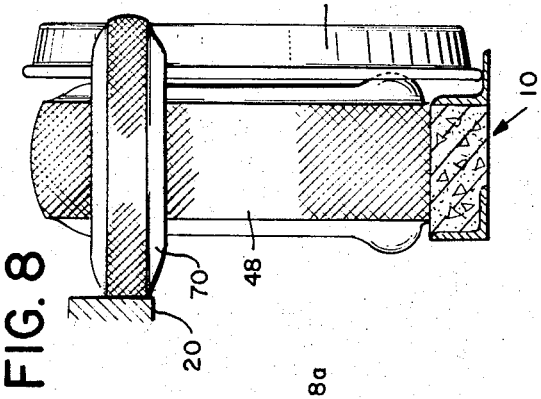
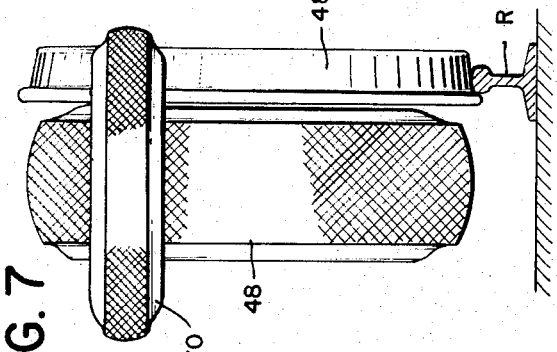
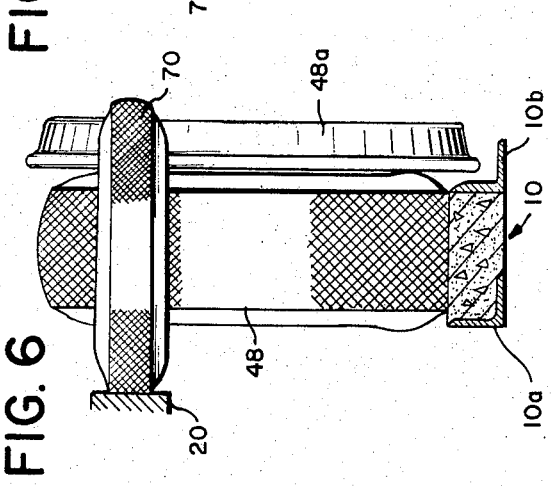
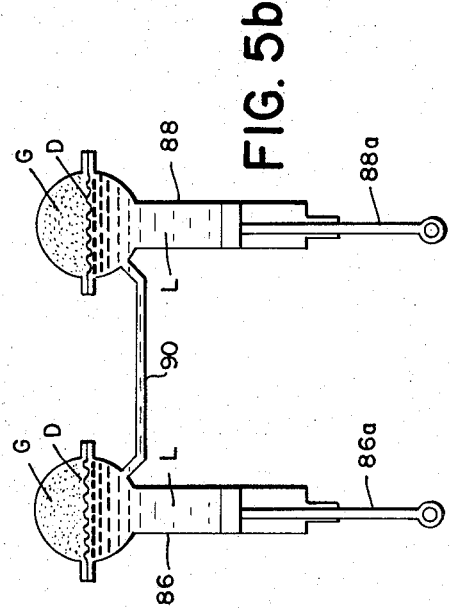
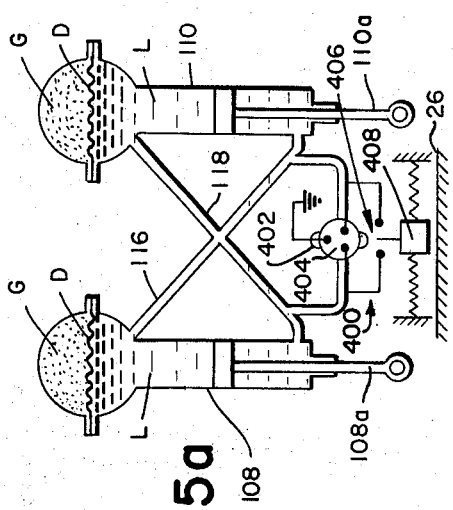
INVENTOR.
SIDNEY H. BINGHAM
BY
Darby & Darby
ATTORNEYS

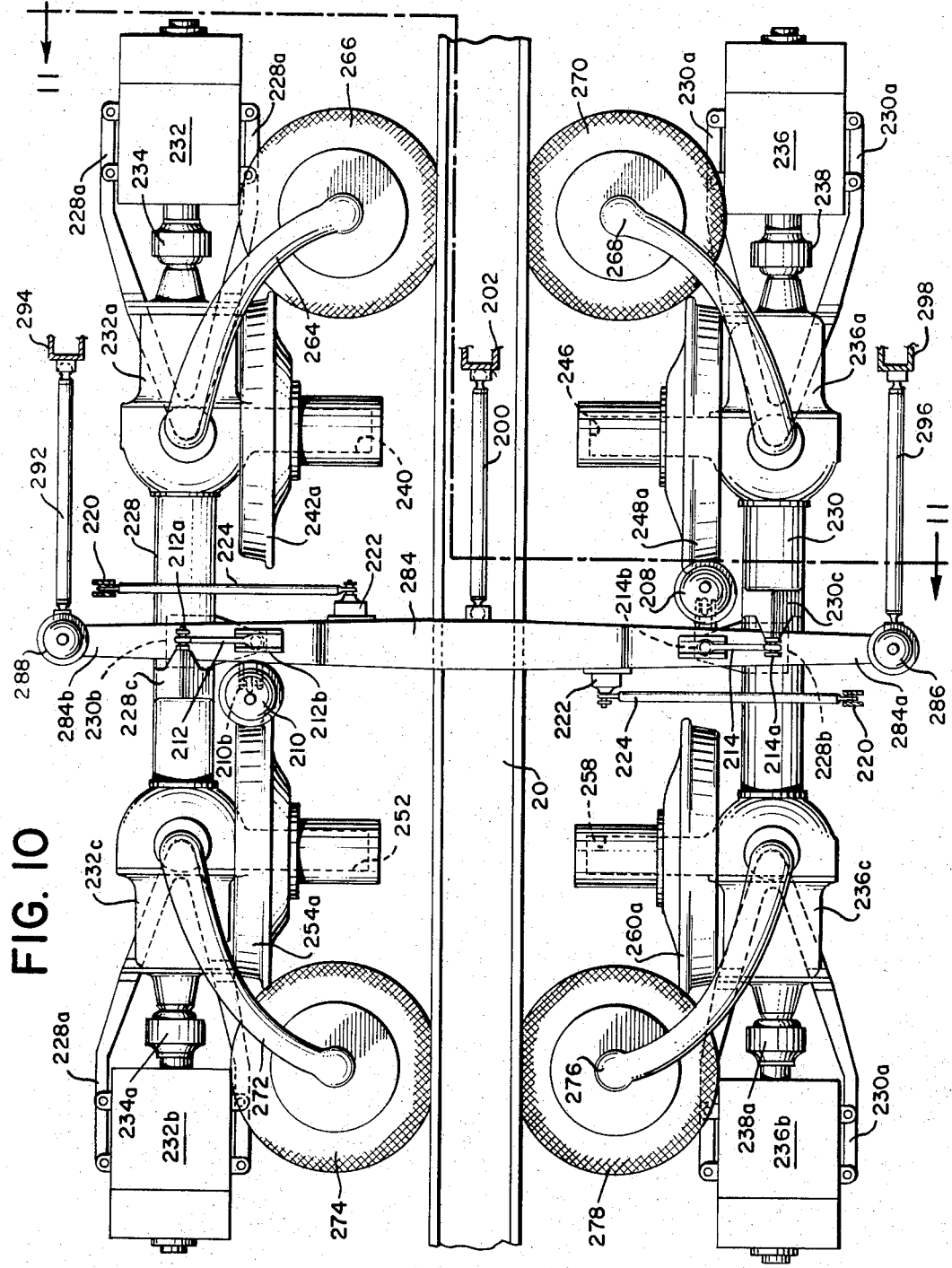

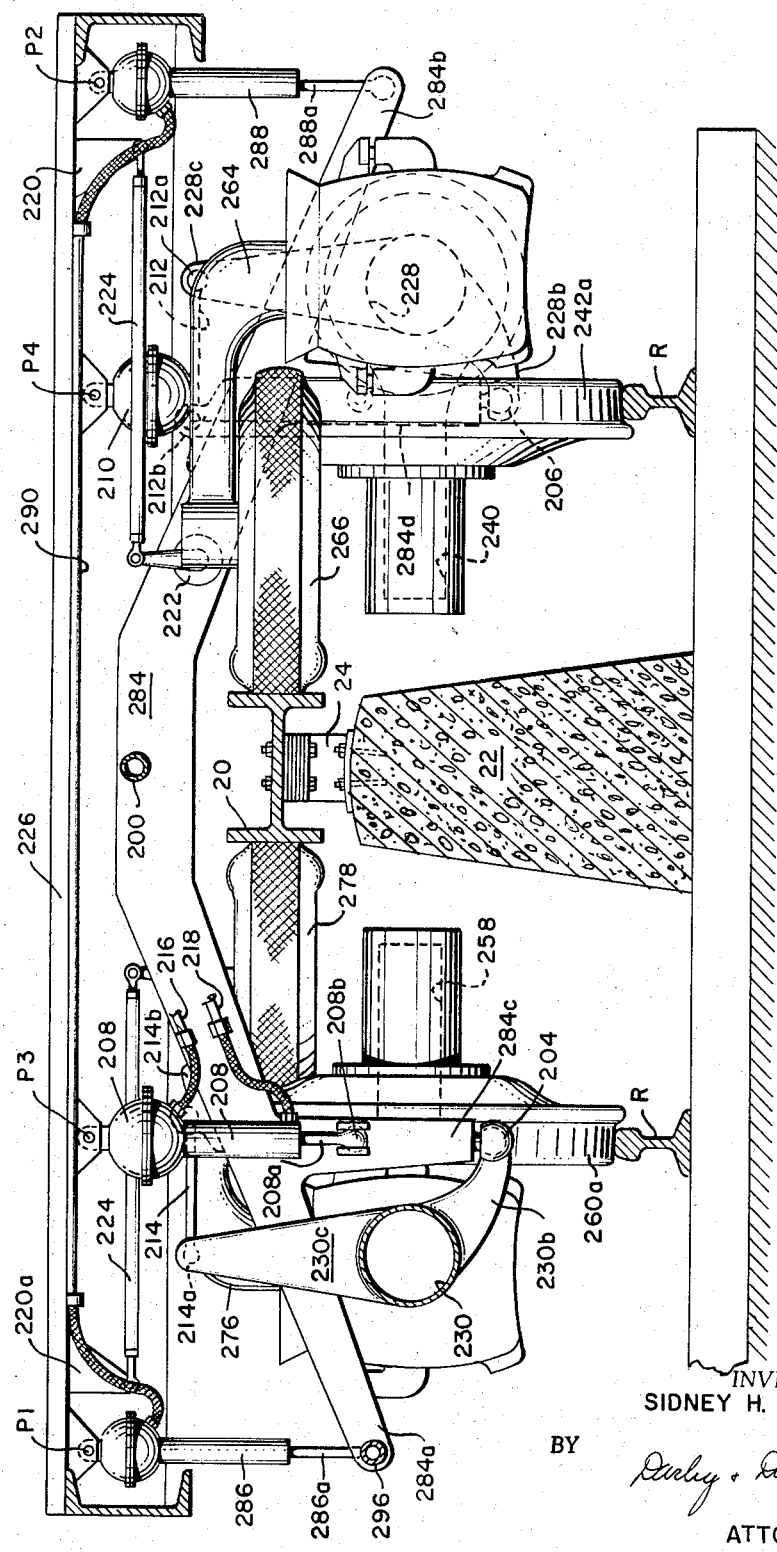

United States Patent Office 3,376,830
Patented Apr. 9, 1968

3,376,830
RAILWAY VEHICLE SUSPENSION SYSTEM
Sidney H. Bingham, 109 E. 35th St.,
New York, N.Y. 10016
Filed July 16, 1965, Ser. No. 472,549
17 Claims. (Cl. 105—133)

ABSTRACT OF THE DISCLOSURE

A railway vehicle undercarriage and a trackway therefor, for accommodating high speed train travel in which the vehicle body is supported on an undercarriage bolster by means of hydropneumatic assemblies having universal connections with the vehicle body and the bolster ends. Other hydropneumatic assemblies provide the vehicle body with roll control and these assemblies are connected to the undercarriage side frames, and to the vehicle body underframe and bolster by means of universal connections. In one modification the control of body roll is effected through the cross connection of the ends of the hydropneumatic devices; in the other modification it is produced by the effect produced on these devices by an inertia device. The trackway comprises two track members for rubber tired running wheels and a central raised track on which guide wheels run. Paired with each running wheel there is a metal flanged wheel. Each track member is formed of two metal angles with vertical and horizontal flanges, the latter flanges being oriented in the same direction, and the space between the angles being filled with, for example, reinforced concrete. The angle whose horizontal flange extends outwardly of the track member provides a guide for the flanged wheel on its vertical surface and a running surface for the flanged wheel if the rubber tired wheel becomes deflated. It is apparent that the undercarriage can operate either on the trackway disclosed, or one having ordinary steel rails. Other elements of the undercarriage and trackway will appear as the specification proceeds.

---

A general object of the invention is to provide hydropneumatic assemblies interconnected between the undercarriage or truck of such vehicles and the chassis and/or body thereof to provide roll control alone or in combination with lateral motion control, as well as load suspension.

A further object of the invention is to provide in the undercarriage or truck of such vehicles side frame members interconected by a transverse bolster to provide freedom of movement thereof in a vertical plane on horizontal axes and pivotal movement on vertical axes.

Still another object of the invention is to provide undercarriage or truck assemblies having the above characteristics on which are journaled combined rubber tired and flanged steel running wheels.

Another object of the invention is to provide in combination with such dual wheeled carriage assemblies or trucks novel right of ways, permitting interchangeable operation on special trackways and flanged steel rails while providing for guidance and running in the event of deflation of the rubber tired wheels.

There are many additional objects of this invention, which are best detailed subsequent to the following description of the several embodiments of the invention selected for illustrative purposes.

Those embodiments are fully depicted in the accompanying drawings.

In those drawings:

FIGURE 2 is a vertical transverse section taken on the line 2—2 of FIGURE 1;

FIGURE 3 is a side elevational view of the mechanism of FIGURE 1;

FIGURES 4a and 4b are cross sectional views on the line 4a, b–4a, b of FIGURE 2, showing a lateral motion control spring in stressed and unstressed conditions;

FIGURE 5a is a diagrammatic view of the hydropneumatic roll control unit employed in the carriage assembly of the preceding figures;

FIGURE 5b is a diagrammatic view of the hydropneumatic vertical suspension unit also employed in the assembly of the preceding figures;

FIGURE 6 is an elevational view partly in cross section, illustrating the dual wheel structure and its association with a special trackway member, showing conditions of full inflation of the rubber tired wheels.

FIGURE 7 is a similar view showing the wheel assembly operating on flanged rails;

Figure 1:
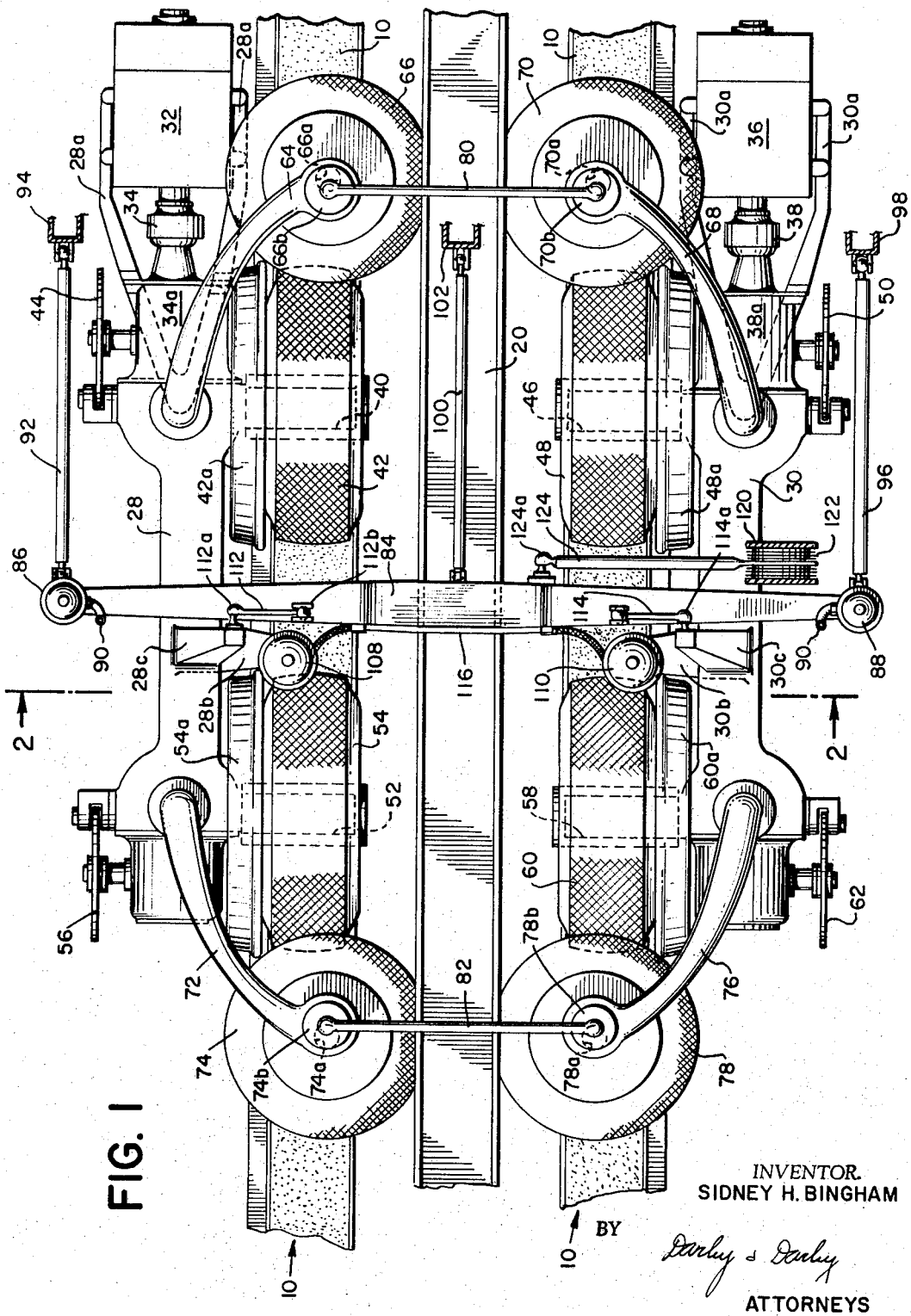
FIGURE 1 is a plan view of one of the carriage assemblies or trucks embodying the various features of the invention herein disclosed.

FIGURE 8 corresponds to FIGURE 6, showing the relationship of the wheels to the trackway when the tire of the running wheel is deflated;

FIGURE 9 corresponds to FIGURE 6, showing the relationship of the wheels to the trackway when the rubber tired guide wheel is deflated;

FIGURE 10 is a plan view of a modified carriage assembly or truck embodying the features of this invention; and FIGURE 11 is a cross sectional view taken on the line 11—11 of FIGURE 10; and FIGURE 12 is a side elevational view of the carriage assembly of FIGURE 10.

In its broad aspects this invention involves novel combinations wherein the undercarriage or truck of a vehicle includes a bolster and wheeled side frame members which are mechanically coupled to have universal movement with respect to each other in order to effect smooth movement thereof over a trackway, notwithstanding its inherent geometrical irregularities, and further wherein the vehicle chassis or body is coupled to the bolster so as to have resiliently controlled lateral motion with respect to the bolster. In addition, the bolster is coupled to the vehicle chassis or body by means of a hydropneumatic roll control unit and, in addition, these parts are coupled so that the vehicle chassis or body is under the control of another hydropneumatic control unit with respect to vertical movements due to loading.

The first embodiment

One form of the invention involving the above general combination will be found in full detail in FIGURES 1 to 5b inclusive. The undercarriage which hereinafter will be referred to as the truck is provided with rubber tired running wheels in combination with flanged steel wheels on the same axes, so as to permit movement of the truck over the trackway 10 and an integrated flanged steel rail system R alternatively, see FIGS. 1 and 7. The trackway includes a pair of members 10, each of which, as illustrated, includes a pair of steel angle irons 12 and 14, arranged in spaced parallel relation and connected together periodically by means of cross braces 16. The space between the angle irons is filled in any suitable manner, to provide a horizontal running surface and, by way of example, the filling 18 is indicated to be reinforced concrete. As seen in FIG. 2, the outer angle irons 12 and their horizontal flanges extend laterally outwardly from the running surface so as to lie under the flanged steel wheels, see, for example, the wheel 48a in FIGURE 6.

As illustrated, for high speed operation it is desirable that the trackway include an elevated guide beam 20 diagrammatically illustrated in FIG. 2, and shown in more detail in FIG. 11, in connection with the modified truck. The guide beam 20 is supported at spaced points by means of fixtures 24 mounted on a suitable support or posts 22, positioned at the transverse center between the trackway and extending along its length. In some systems the center guide beam 20 and its support 22 may not be required, as truck guidance can be effected by the trackways 10 or the rails R.

There is diagrammatically shown at 26 the vehicle chassis on which can be mounted any suitable form of body, not shown.

The truck has a pair of side frame members 28 and 30, in the corresponding end of each of which are the cradles 28a and 30a respectively, in which are mounted the drive motors 32 and 36. The shafts 34 and 38 of these motors extend into the side frame members 28 and 30 which are hollow, see FIG. 2, and are mechanically coupled into the usual gear trains, not shown, which are in the gear housings 34a and 38a respectively.

The side frame members are provided with wheel supports illustrated as the stub shafts 40 and 52 in the case of the side frame member 28, and 46 and 58 in the case of side frame member 30. Journaled in suitable bearings on the shaft 40 is the rubber tired wheel 42 and the flanged steel wheel 42a; on the stub shaft 52 the rubber tired wheel 54 and flanged steel rail 54a; on the shaft 46 the rubber tired wheel 48 and the steel flanged wheel 48a; and on the shaft 58 the rubber tired wheel 60 and the steel flanged wheel 60a. At this point it may be noted that the rubber tires can be, and preferably are, of the pneumatic type. Mounted on the side frame members 28 and 30 respectively are the disk brakes 44 and 56, and 50 and 62. These brakes are shown diagrammatically and are connected to the drive shafts in a well known manner. Since they form no part of this invention, no further reference will be made to them. It is also noted that the specific manner in which the motors are connected through the gear trains to the wheel groups can be effected in accordance with well known practice and hence no specific connecting structure is shown.

As clearly shown in FIGURE 1, the side frame members 28 and 30 have arms extending from the top side at each end, as indicated at 64 and 72, and 68 and 76 respectively, on which are journaled respectively the guide wheels 66 and 74, and 70 and 78. The guide wheels 66, 74, 70 and 78 are respectively journaled on shafts 66a, 74a, 70a and 78a, which are integral with disks 66b, 74b, 70b and 78b respectively. The shafts are eccentrically mounted on the disks to permit the rotation of the disks for lateral adjustment of the related guide wheels with respect to the guide rail 20. The disks 66b and 70b are connected by the rod 80 and the disks 74b and 78b are connected by the rod 82.

Extending transversely of the truck at its longitudinal center is a heavy steel bolster 84, which has a central horizontal portion extending outwardly and downwardly at each end in the extensions 84a and 84b. The ends of this bolster are connected to the chassis or car body 26 by means of hydropneumatic assemblies. Thus, the end 84a of the bolster is connected to the piston rod 86a associated with the cylinder 86, which, in turn, is pivotally mounted at P1 on the chassis. The other end of the bolster, in turn, is pivotally connected to the piston rod 88a, which cooperates with the cylinder 88, which, in turn, is pivotally connected to the chassis at P2. Referring to FIG. 5b, there is shown in more detail these hydropneumatic load supporting units. As shown, each hydropneumatic cushioning device includes a piston which traps a liquid L between it and a flexible diaphragm D. The space above the diaphragm D in each case is filled with a suitable gas G. Referring back to FIG. 2, it will be seen that the liquid spaces of the cylinder 86 and 88 are in free communication through the pipe 90, which can be flexible or include flexible ends, if desired.

Turning to FIGURE 1, it will be seen that one end of the bolster is attached to the arm 94, dependent from the chassis or car body by means of a link 92, the connection at each end of the link being a pivotal connection.

Similarly, the other end of the bolster is connected to a dependent bracket 98 by the pivotally mounted link 96. As shown in FIGURES 1 and 3 the bolster is similarly connected to a bracket 102 dependent from the chassis or car body to the center of the bolster by means of the pivotally connected link 100. The links 92, 96 and 100 are the familiar drag rods frequently used in equipment of this type.

As shown in FIG. 2, the side frame members 28 and 30 are provided with downwardly extending rigid arms 28b and 30b respectively. The bolster 84 is provided with dependent columns 84c and 84d, which are provided with universal ball joint connections with the arms 28b and 30b, as indicated at 104 and 106 respectively.

The universal joints 104 and 106 are attached to the offset ends of the dependent columns, see for example, the universal joint 106 in FIG. 3. These offset ends are provided with upstanding universal joint connections at 108b and 110b for securing the lower ends of the piston rods 108a and 110a cooperating with the cylinders 108 and 110, see FIG. 2. The upper ends of these cylinders are connected to the chassis or body 26 at the pivot points P3 and P4 respectively. Turning to FIG. 5a, it will be seen that, as in the case of the load supporting hydropneumatic units these hydropneumatic roll control units, which include the cylinders 108 and 110 also have pistons, which trap an incompressible liquid L between them and the flexible diaphragms D. These diaphragms also trap gas G above them. In this case, as diagrammatically illustrated in FIG. 5a, and shown clearly in FIG. 2, the cylinders 108 and 110 are cross connected, or are in communication through the pipes 116 and 118. As can be seen from FIG. 5a, the space above the piston in cylinder 108 is connected by the pipe 116 to the space below the piston in the cylinder 110. Similarly a reverse connection is effected through the pipe 118. It is noted in this arrangement particularly that there must be a fluid tight seal between the cylinders 108 and 110 with the associated piston rods 108a and 110a.

Turning again to FIG. 2, it will be seen that the side frame members 28 and 30 have upwardly extending rigid arms 28c and 30c, to the ends of which respectively at 112a and 114a are pivotally connected the links 112 and 114. The other ends of the links are connected by ball joints to the bolster at 112b and 114b.

A resilient lateral motion control is provided in the form of a rod 124. One end of this rod is connected by a ball joint connection 124a to the bolster 84, see FIG. 1, and to a resilient spring assembly 122, which is mounted on a rigid dependent bracket 120 supported by the chassis or car body 26. The construction of this spring assembly is shown in detail in FIGS. 4a and 4b. Mounted between the plates which form the rigid bracket 120 are a series of resilient, for example, rubber rings 130, which alternate with metal plates 132. The rings and plates are arranged concentrically and they are cemented together so as to form a unitary structure. The plates 132 are provided with central apertures 132a of decreasing diameter towards the center of the structure and from each side. Secured between the two central plates 132 is the flange 128 of a metal tube 126, which extends through the apertures 132a and centrally thereof when the structure is relaxed, as shown in FIG. 4b. The plates of the bracket 120 are provided with a large aperture 120a, into which the ends of the tube 126 extend. The other end of the rod 124 is connected to the flange 128, as indicated in FIG. 4a. As indicated in FIG. 4a, when a longitudinal force is applied to the rod 124 the spring structure will be distorted laterally on cradles which increase from the ends towards the center, as illustrated in FIG. 4a. The diameters of the apertures 120a and 132a are proportioned so that under full stress the tube 46 will engage the bracket 120 and the edges of the apertures 132a. When assembled in the truck, as illustrated in FIG. 1, it will be seen that through this resilient connection the lateral motion of the chassis or car body, with respect to the bolster will be controlled by the resiliency of the spring 122. This spring structure is a preferred arrangement, but those skilled in the art can appreciate that other resilient members could be interposed in this connection to produce the desired lateral motion control.

On analysis, it will be seen that the side frame members 28 and 30 can pitch in vertical planes because of the universal joint connections between them and the associated ends of the bolster and, in addition, these side frame members can have limited movement on their respective vertical axes under the control of the guide wheels. As is clear from FIG. 2 it will be seen that the roll control of the chassis, with respect to the bolster, is effected through the hydropneumatic assemblies which directly connect the bolster with the chassis or car body. The drag links 92, 100 and 96 will hold the bolster transversely of the chassis in the usual manner. The connection between the bolster and the chassis through the lateral motion control spring will restrain the relative lateral movement of the car body, with respect to the bolster. Finally, the vertical suspension of the loaded chassis, with respect to the bolster, is effected through the hydropneumatic cushioning devices, which include the cylinders 86 and 88. The load of the chassis is transferred directly through the pivotal connections at P1 and P2 to the ends of the bolster 84, as can be seen from FIG. 2. The universal joints at 108b and 110b provide for the lateral motion of the chassis with respect to the bolster under control of the spring 122. The links 112 and 114 maintain a lateral relationship between the side frame members and the bolster, while leaving the bolster some freedom of vertical movement.

Thus, the operative association of the parts of the trucks leave all the required freedom of movement to be encountered in normal operation, such movements as required being controlled and modified by the hydropneumatic cushioning units and the spring 122.

FIGURES 6, 7, 8 and 9 serve further to indicate the flexibility of this system with respect to interchange between the trackway 10 and the rails R. Over the trackway the rubber tired wheels, such as the wheel 48, are the running and load bearing wheels. Should the tire 48 be deflated sufficiently, so that the flange of wheel 48a engages the flange 10b of the trackway, that flange becomes the running and load bearing member, see FIG. 8. Should the guide wheel 70 become deflated, as indicated in FIG. 9, the flange of the wheel 48a will engage the vertical portion of the angle iron 10b, to give lateral guidance which, at this time, would be lost in the beam 20. When the truck is riding on the rails R the rubber tired wheels, such as 48, clear all normal obstructions.

*The second embodiment*

The second form of this invention is illustrated in FIGS. 10, 11 and 12. In this case the undercarriage or trucks are provided only with steel flanged wheels, and hence are adapted to ride on standard flanged rails R. As before, for high speed operation a central guide beam 20 is preferred. The truck includes the side frame members 228 and 230, which have fore and aft extensions 228a and 230a respectively, on which are supported the drive motors 232 and 232b, and 236 and 236b. The motors are connected to the wheels through the drive shafts 234 and 238 and gear trains, which, in this case, will be present in gear boxes 232a and 232c for the member 228 and 236a and 236c for the member 230. The side frame members, as before have the fore and aft guide wheel supporting arms 264, 272, 268 and 276. Journaled on the ends of these arms are the guide wheels 226, 274, 270 and 278, which ride along the sides of the guide beam 20.

The side frame member 228 has the fore and aft stub shafts 240 and 252, on which are journaled the flanged steel running wheels 242 and 254a. Similarly the side frame member 230 has the stub shafts 246 and 258, on which are journaled the flanged steel running wheels 248a and 260a.

Extending transversely of the truck at its center is the bolster 284 having the downward extensions 284a and 284b at its ends, see FIG. 11. This bolster is held transversely of the chassis 226 by means of the drag links 292, 200 and 296, see FIG. 10. These rods are connected by universal joint connections at one end to the bolster, and at the other end to rigid brackets 294, 202 and 298 dependent from the chassis 226. The connections to these brackets are also preferable through universal joint connectors, as shown.

Lateral motion control in this case is effected through the links 224, which are pivotally connected to the depending brackets 220 at one end and to the torsion spring assemblies 222 at the other end. The springs 222 are mounted on opposite sides of the bolster, see FIG. 10, and the ends of the links 224 are connected to levers forming parts of the spring assemblies 222. These torsion springs can be of any suitable form, as those skilled in the art will understand. The ends 284a and 284b of the bolster are connected to the sides of the chassis 226 through the load supporting hydropneumatic assemblies comprising the piston rods 286a and 288a and the cylinders 286 and 288. The cylinders are pivotally connected to the chassis at P1 and P2 and are in communication through the conduit 290. These assemblies correspond to the structure diagrammatically illustrated in FIG. 5b, as before.

The bolster is provided with the rigid dependent columns 284c and 284d, which are connected through universal joint connections 204 and 206 to the rigid downwardly extending arms 228b and 230b of the side frame members. The side frame members are provided with upstanding rigid arms 228c and 230c. Rods 214 and 212 are pivotally connected between the upper ends of these arms and the bolster, as indicated at 214a and 214b and 212a and 212b. It is preferable that the connections at these points be universal joint connections.

Roll control, as before, is effected through the hydropneumatic cushioning assemblies comprising respectively the cylinders 208 and 210 and the piston rods 208a and 210a, see FIG. 12. As is clear from FIG. 10, these assemblies, in this case, are on opposite sides of the bolster. The cylinders are respectively connected to the chassis at the pivot points P3 and P4, and the related piston rods to the related columns at the points 208b and 210b, see FIG. 12.

As shown in FIG. 11, and comparable to the showing in FIG. 5a, the lower end of cylinder 208 is connected through the pipe 218 to the upper end of cylinder 210 and conversely the lower end of cylinder 210 is connected by the pipe 216 to the upper end of cylinder 208.

The truck of this modification is, in its basic cooperative assembly, functionally similar to that of the first embodiment, but the structure is simplified by the omission of rubber tired running wheels. The result is that this arrangement is primarily designed to operate on flanged steel rails R. For high speed operation the guide beam 20 and the cooperating guide wheels are desirable, but can be omitted for slower installations in which case guidance is effected by means of the cooperation between the flanged steel running wheels and the rails R. As in the previous arrangement, it will be seen that the elements of the hydropneumatic roll control unit are directly pivotally connected to the chassis, as are the elements of the vertical load suspending hydropneumatic unit.

Further description and amplification of the construction and function of the hydropneumatic piston and cylinder assemblies diagrammatically illustrated in FIGURES 5a and 5b seems desirable. The intercommunication provided by the pipe 90 between the cylinders 86 and 88 produces the effect under loading of the car of permitting the liquid in the cylinders to move back and forth between them, equalizing the pressure therein. Under the loading of the vehicle body, the liquid L is put under pressure and a vertical resiliency is provided by the reaction of that pressure on the gas G trapped above the flexible diaphragms D. Since the liquid can flow freely through the pipe connection 90 there is no rolling restraint and with respect to these load suspension elements the car body would be in a state of lateral instability.

However, superior and novel roll control is provided through the hydropneumatic piston and cylinder assemblies shown in FIG. 5a. As is seen therein, the liquid L above the piston in cylinder 108 and below the piston in cylinder 110 can flow back and forth through the pipe connection 16. Likewise the liquid above the piston in cylinder 110 and below the piston in cylinder 108 can flow back and forth through the connection 118. This cross connection of the double acting pistons diminishes the rolling action of the car body. As is apparent, rolling motion builds up differential pressure changes, causing rolling restraint which can also be defined as passive roll control.

As diagrammatically illustrated in FIG. 5a a valuable refinement can be effected by interconnecting the pipes 116 and 118 through a motor driven reversible pump 402. This pump is provided with a reversible motor 404 controlled by a reversing switch 406, operated by means of an acceleration sensitive governor diagrammatically illustrated at 408. Governors of this type in various forms are well known in the art and are inertial devices responding to motion changes in an obvious and well-known manner. With this arrangement active roll control is provided, which is important to the comfort of the passengers, for example, while permitting higher operating speeds on curves than might be provided by tracks having superelevation adequate only for lower speeds of operation. As those skilled in the art will understand, by operating the pump 402 in the proper direction, one side of the car can be elevated with respect to the other, so to lean toward the center of track curvature. Correct operation of the pump, as is obvious, will be effected by means of the inertial control of the switch 406 to cause the motor 404 to operate the pumps 402 in the right direction to effect such elevation. This inertial control assembly has been given the general reference character 400 and has been diagrammatically shown as part of the vehicle combination of the first embodiment, see FIG. 2.

From the above disclosure, it will be apparent to those skilled in the art that the subject matter of this invention can be embodied in structures involving different structural details without departing from the novel combinations herein disclosed. It is desired, therefore, that the protection afforded by the patent issued hereon be determined by its claims, the disclosure being selected solely in an illustrative sense.

What is claimed is:

1. A vehicle comprising a body, a wheeled undercarriage including a load bearing member extending transversely of the carriage, a pair of fluid pressure, load supporting cylinder and piston assemblies respectively connected between the ends of said member and said body, a pipe connection establishing communication between the cylinders of said assemblies, a second pair of fluid pressure roll control cylinder and piston assemblies respectively connected between said undercarriage assembly and said body and pipe connections cross connecting said cylinders on opposite sides of the pistons of said second assemblies.

2. In the combination of claim 1, each of said cylinder and piston assemblies including a diaphragm dividing its cylinder into an upper and lower portion, the upper portion of each cylinder for containing a gas and the lower portion for containing a liquid.

3. In the combination of claim 1 inertia controlled means for effecting differential pressure conditions in the cylinders of said roll control assemblies for effecting position roll control of the vehicle.

4. In a vehicle the combination comprising a body supporting frame, a carriage comprising a pair of side frame members having longitudinally spaced fore and aft running wheels journaled thereon, a bolster extending transversely of said frame members, means providing universal joint connections near each end of said bolster and on said side frame members, drag rods connecting said bolster to said body frame, a pair of hydropneumatic load supporting cylinder and piston assemblies connected between said body frame and the ends of said bolster, a pipe establishing communication between the cylinders of said assemblies, a second pair of hydropneumatic cylinder and piston roll control assemblies connected between said body frame and said side frame members and pipes establishing communication between the cylinders of said second hydropneumatic cylinder and piston assemblies on opposite sides of their associated pistons.

5. In the combination of claim 4 a resilient spring connected to said body frame and a link connecting said spring to said bolster intermediate its ends.

6. In a railway vehicle a car body, at least one undercarriage having wheel supporting members, running and guiding wheels journaled on said members and a bolster, means including universal joint connectors for mounting said bolster on said wheel supporting members, hydropneumatic load suspension assemblies comprising cylinders and pistons, said cylinders being pivotally connected to said car body and said pistons being pivotally connected to the ends of said bolster, a pipe establishing communication between said cylinders, a pair of vertical roll control cylinder and piston assemblies, said cylinders being pivotally connected to said car body and said pistons being pivotally connected to said bolster, and pipes cross connecting said last mentioned cylinders on opposite sides of their respective pistons for establishing communication between the portions of the cylinders on opposite sides of said pistons, and drag rods connecting said bolster with said car body.

7. In the combination of claim 6, means interconnecting said car body with said bolster to provide relative lateral motion control therebetween.

8. In the combination of claim 6, resilient means interconnecting said car body with said bolster to provide lateral motion control of said bolster.

9. In the combination of claim 6, said running and guiding wheels comprising pairs, each pair consisting of a rubber tired wheel and a flanged steel wheel.

10. In a railway vehicle a car body frame, at least one undercarriage for supporting said frame, comprising a pair of side frame members, a bolster extending transversely between said side frame members, said side frame members and bolster having cooperating extensions, means for pivotally connecting said extensions, a load suspension unit comprising a pair of cylinder and piston assemblies positioned adjacent each end of the bolster, means for pivotally connecting the pistons to the ends of the bolster, means for pivotally connecting the cylinders to the body frame, a pipe establishing communication between the spaces of said cylinders above the pistons, a roll control unit comprising a pair of piston and cylinder assemblies, means for pivotally connecting said latter pistons to said bolster, means for pivotally connecting said latter cylinders to said body frame and means for establishing cross-connections between said latter cylinders respectively above and below their respective pistons and resilient lateral motion control means interconnecting said body frame with said bolster.

11. In the combination of claim 10, said frame members having running and guiding wheels mounted thereon.

12. In the combination of claim 10, said frame members having running and guiding wheels mounted thereon, said running wheels comprising pairs of rubber tired wheels and flanged steel wheels.

13. In the combination of claim 10, drag links pivotally interconnecting the ends of said bolster with said body frame.

14. In the combination of claim 10, driving motors mounted on said side frame members.

15. In the combination of claim 10 each of said cylinders containing a diaphragm forming an upper compartment for containing gas and a lower compartment for containing a liquid.

16. A vehicle trackway comprising a pair of parallel track members, each track member being generally rectangular in cross section and comprising a pair of laterally spaced parallel metal angle bars, said bars each consisting of a substantially vertical flange and a substantially horizontal flange, said substantially horizontal flanges lying in a common plane and extending in the same direction from their respective substantially vertical flanges, means for holding said bars in said parallel relation to form a channel and means in said channel providing a running surface, the vertical flange of one of said bars providing a wheel guiding surface and its horizontal flange providing a horizontal running surface.

17. In combination with a trackway as defined in claim 16, a vehicle having at least one rubber tired runing wheel and a concentric flanged metal wheel for each track member, the rubber tired wheel normally riding on said running surface with the flange of said metal wheel traveling adjacent said guiding surface and above said horizontal running surface.

References Cited

UNITED STATES PATENTS

| | | | |
|---|---|---|---|
| 2,226,432 | 12/1940 | Heinze | 104—124 |
| 2,353,503 | 7/1944 | Rost et al. | 280—112 |
| 2,404,091 | 7/1946 | Porteus | 105—199 |
| 2,474,471 | 6/1949 | Dolan | 105—164 |
| 2,861,523 | 11/1958 | Berry | 105—215 |
| 3,012,521 | 12/1961 | Lich | 104—118 X |
| 3,014,434 | 12/1961 | Cox | 105—190 X |
| 3,084,637 | 4/1963 | Kohout | 105—215 X |
| 3,148,632 | 9/1964 | Bingham | 104—120 |
| 3,208,402 | 9/1965 | Bingham | 105—164 X |

ARTHUR L. LA POINT, *Primary Examiner.*

H. BELTRAN, *Assistant Examiner.*

UNITED STATES PATENT OFFICE
CERTIFICATE OF CORRECTION

Patent No. 3,376,830    Dated April 9, 1968

Inventor(s)    Sidney H. Bingham

It is certified that error appears in the above-identified patent and that said Letters Patent are hereby corrected as shown below:

Fig. 5A should be replaced as shown below.

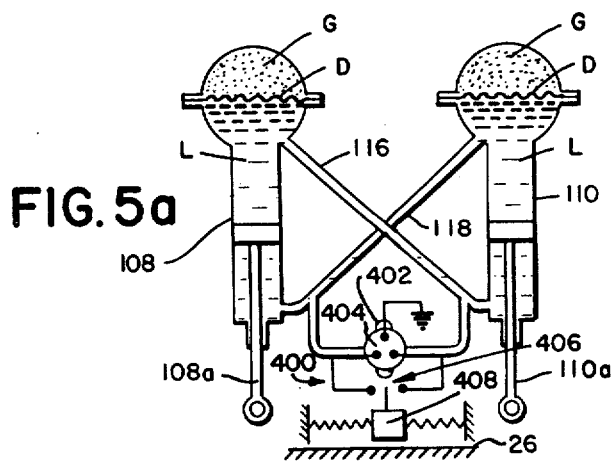

Signed and Sealed this twenty-third Day of March 1976

[SEAL]

Attest:

RUTH C. MASON
Attesting Officer

C. MARSHALL DANN
Commissioner of Patents and Trademarks